US012559950B2

(12) United States Patent
Chen

(10) Patent No.: US 12,559,950 B2
(45) Date of Patent: Feb. 24, 2026

(54) DIMENSIONALLY STABLE FLOOR PANEL

(71) Applicant: Novalis Holdings Limited, Wanchai (HK)

(72) Inventor: Hao Allen Chen, Ashburn, VA (US)

(73) Assignee: Novalis Holdings Limited, Wanchai (CN)

( * ) Notice: Subject to any disclaimer, the term of this patent is extended or adjusted under 35 U.S.C. 154(b) by 0 days.

(21) Appl. No.: 15/785,971

(22) Filed: Oct. 17, 2017

(65) Prior Publication Data

US 2018/0135313 A1 May 17, 2018

Related U.S. Application Data

(60) Provisional application No. 62/408,998, filed on Oct. 17, 2016.

(51) Int. Cl.
*E04F 15/10* (2006.01)
*B32B 3/06* (2006.01)
(Continued)

(52) U.S. Cl.
CPC .............. *E04F 15/107* (2013.01); *B32B 3/06* (2013.01); *B32B 5/028* (2013.01); *B32B 27/08* (2013.01); *B32B 27/12* (2013.01); *B32B 27/20* (2013.01); *B32B 27/22* (2013.01); *B32B 27/304* (2013.01); *C08K 5/0016* (2013.01); *C09D 127/06* (2013.01); *E04F 15/02038* (2013.01); *E04F 15/105* (2013.01); *B32B 2262/101* (2013.01); *B32B 2307/3065* (2013.01);
(Continued)

(58) Field of Classification Search
CPC ......... B32B 3/06; B32B 5/028; C09D 127/06; E04F 15/107; E04F 15/02038; E04F 15/105
See application file for complete search history.

(56) References Cited

U.S. PATENT DOCUMENTS 1,931,650 A * 10/1933 Elmendorf ............ E04F 15/166
52/390
9,624,678 B2 4/2017 Segaert et al.
(Continued)

FOREIGN PATENT DOCUMENTS

| CN | 103741930 A | 4/2014 |
| CN | 104428475 A | 3/2015 |
(Continued)

OTHER PUBLICATIONS

Curlee, T.R, and S.Das, "Plastic Wastes—Management, Control, Recycling and Disposal," William Andrew Publishing, First Edition, pp. 358-377 (Year: 1991).*
(Continued)

*Primary Examiner* — Maria V Ewald
*Assistant Examiner* — Ethan Weydemeyer
(74) *Attorney, Agent, or Firm* — Barley Snyder

(57) ABSTRACT

A floor panel is provided. The floor panel composition includes a wear layer and a base layer. The base layer includes a first base sections having a first composition of polyvinyl chloride, filler, and plasticizer, a second base sections having a second composition with a higher content of polyvinyl and plasticizer than the first composition, and a glass fiber section positioned between the first base section and the second base section.

45 Claims, 6 Drawing Sheets

FIG. 5

(51) Int. Cl.

| | |
|---|---|
| B32B 5/02 | (2006.01) |
| B32B 27/08 | (2006.01) |
| B32B 27/12 | (2006.01) |
| B32B 27/20 | (2006.01) |
| B32B 27/22 | (2006.01) |
| B32B 27/30 | (2006.01) |
| C08K 5/00 | (2006.01) |
| C09D 127/06 | (2006.01) |
| E04F 15/02 | (2006.01) |
| *C08K 5/01* | (2006.01) |
| *C08K 5/09* | (2006.01) |
| *C08K 5/098* | (2006.01) |
| *C08K 5/101* | (2006.01) |
| *C08K 11/00* | (2006.01) |

(52) U.S. Cl.
CPC ..... *B32B 2307/308* (2013.01); *B32B 2471/00* (2013.01); *C08K 5/01* (2013.01); *C08K 5/09* (2013.01); *C08K 5/098* (2013.01); *C08K 5/101* (2013.01); *C08K 11/00* (2013.01); *E04F 2201/0107* (2013.01); *E04F 2201/023* (2013.01); *E04F 2201/043* (2013.01); *E04F 2203/08* (2013.01)

(56) References Cited

U.S. PATENT DOCUMENTS

| | | | | |
|---|---|---|---|---|
| 2005/0221047 | A1* | 10/2005 | Weitzer | E04F 15/04 |
| | | | | 428/60 |
| 2008/0081875 | A1* | 4/2008 | Tian | C08L 67/02 |
| | | | | 525/165 |
| 2008/0233364 | A1* | 9/2008 | Larson | B32B 5/28 |
| | | | | 428/196 |
| 2009/0288359 | A1* | 11/2009 | Martin, Jr. | C08K 7/02 |
| | | | | 52/309.1 |
| 2013/0104485 | A1* | 5/2013 | Meersseman | B27N 7/00 |
| | | | | 52/578 |
| 2015/0121793 | A1* | 5/2015 | Segaert | B29C 70/081 |
| | | | | 52/506.01 |
| 2016/0230399 | A1* | 8/2016 | Zhang | E04F 15/02172 |
| 2017/0106578 | A1* | 4/2017 | Lombaert | B29C 48/08 |

FOREIGN PATENT DOCUMENTS

| | | | |
|---|---|---|---|
| CN | 104619936 A | | 5/2015 |
| CN | 104847082 A | | 8/2015 |
| CN | 105178561 A | * | 12/2015 |
| CN | 105500836 A | | 4/2016 |
| CN | 105604298 A | | 5/2016 |
| EP | 2746047 A2 | | 6/2014 |
| JP | 8565727 A | | 1/1981 |
| WO | 2015106095 A1 | | 7/2015 |
| WO | 2016001775 A1 | | 1/2016 |
| WO | 2018087637 A1 | | 5/2018 |

OTHER PUBLICATIONS

International Search Report and Written Opinion of the International Searching Authority, 7 pages, dated May 11, 2018.
Abstract of CN 105604298A, dated May 25, 2016, 2 pages.
Abstract of CN 105178561A, dated Dec. 23, 2015, 1 page.
Abstract of CN 105500836A, dated Apr. 20, 2016, 2 pages.
Abstract of JPS565727A, dated Jan. 21, 1981, 1 page.
Extended European Search Report, dated Mar. 13, 2020, 8 pages.
Chinese First Office Action, dated Apr. 26, 2020, 16 pages.
European Patent Office Communication, dated Oct. 20, 2020, 5 pages.
Chinese Second Office Action and English translation, dated Mar. 5, 2021, 8 pages.
1 European Patent Office Communication, App. No. 17 862 048.0-1107, dated Oct. 4, 2021, 20 pages.

* cited by examiner

DIMENSIONALLY STABLE FLOOR PANEL

CROSS-REFERENCE TO RELATED APPLICATIONS

This application claims the benefit of the filing date under 35 U.S.C. § 119(a)-(d) of U.S. Provisional Patent Application No. 62/408,998, filed Oct. 17, 2016.

FIELD OF THE INVENTION

The invention generally relates to a floor panel and, more specifically, to a dimensionally stable floor panel composition having a reinforced layer with a guide edge

BACKGROUND

Luxury vinyl tiles ("LVT") are generally well known and a considerably popular flooring option. LVT can be manufactured to have a natural look of wood, stone, slate, brick, ceramic or many other designs as long as they can be printed on a film by rotogravure printing, digital printing and many other means. The flooring is designed with the resilience and durability of hard-wearing vinyl flooring. While adhesives and locking systems are commonly used during the installation of LVT, loose lay floating installation has become much more popular, considering the simplicity and efficiency during installation.

A loose lay tile ("LLT") product is simply laid freely on the floor or subfloor and installed snugly tight against the walls. LLT characteristically require a few critical features: (1) a low coefficient of expansion and contraction, (2) thick and heavy with glass fiber veil to give the best dimension stability and fixation of placement, (3) flatness to make the visual of a large installation floor like a monolithic flooring sheet, and (4) a non-slip backing to further improve its fixation of its placement. However, even with excellent flatness properties, deformation often results from inadvertent mistakes during packaging and storage. Edge peaking and curl problems usually occur and are accentuated even more during the transportation, particularly in cold climates. These issues are not only visually displeasing, annoying installer and they also compromise installation. Since solutions are time consuming and costly. It serves no other benefits except for holding the curl down.

SUMMARY

Accordingly, the present invention was devised in light of the problems described above, to provide a dimensionally stable floor panel composition having a reinforced layer with a guide edge.

Therefore, there is a need to develop a way to overcome the edge peaking or curling not inherited from the product itself but from the complex environment of packaging and transportation. A floor panel is provided. The floor panel composition includes a wear layer and base layers. The base layer includes a first base sections having a first composition of polyvinyl chloride, filler, and plasticizer, a second base sections having a second composition with a higher content of polyvinyl and plasticizer than the first composition, and a glass fiber section positioned between the first base section and the second base section. Further, a protrusion is provided on one side the base layer and extending outward beyond the top layer.

BRIEF DESCRIPTION OF THE DRAWINGS

The invention will be explained in greater detail with reference to embodiments, referring to the appended drawings, in which.

DETAILED DESCRIPTION OF THE EMBODIMENT(S)

Figure 1:
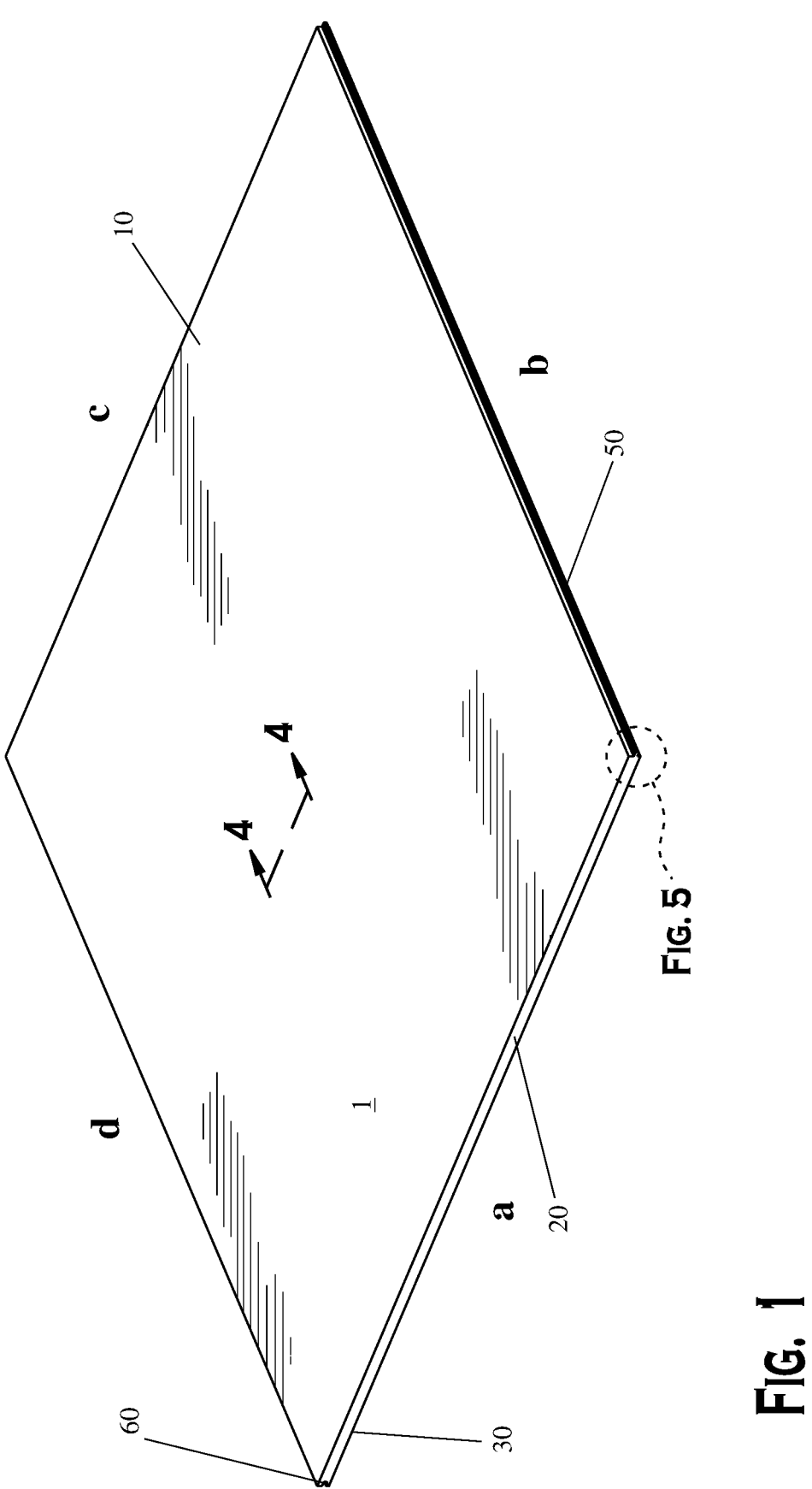
FIG. 1 is a top perspective view of a dimensionally stable floor panel according to the invention.
Figure 2:
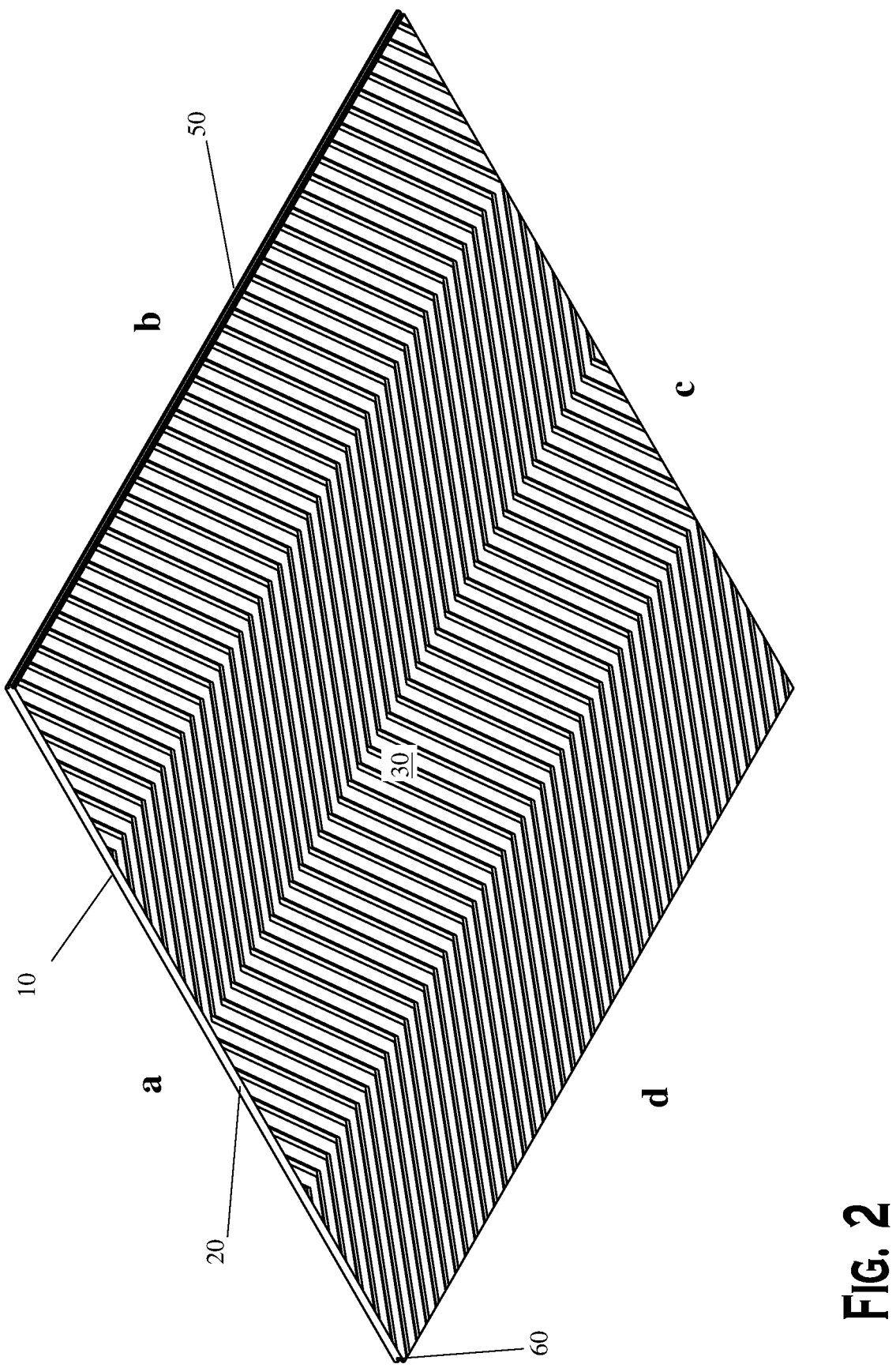
FIG. 2 is a bottom perspective view of the dimensionally stable floor panel of FIG. 1.

A surface covering relating to floor coverings, wallpapers, or other surface coverings having a homogeneous, single layer, or a heterogeneous, multiple layer construction will now be discussed. Exemplary embodiments of the floor covering include Loose Lay Luxury Vinyl Tiles and Planks ("LLT") as well as sheet flooring. However, one of ordinary skill in the art would appreciate that the surface covering may also include other types of coverings, such as carpet backing, wall coverings, semi-rigid extrusion sheet, vinyl underlayment, and resilient hard surface flooring such as vinyl composition tile, inlaid product as well as cushion flooring.

Referring now to the drawings, in which like numerals refer to like parts throughout the several views and embodiments.

In the embodiment shown in Figures, a single floor panel 1 is prepared from laminated polymeric components. Each floor panel 1 is prepared from laminated polymeric components, including vinyl, forming several layers. The total thickness of each floor panel, in the embodiments shown is approximately 3.00-5.00 mm. However, it is also possible to prepare the floor panel 1 having one or more layers, with each layer having differing thickness. The composition of the floor panel 1 may vary as well, with the floor panel 1 being prepared from various materials, including but not limited to polymers, ceramics, metals, organic materials, etc.

However, as illustrated in FIGS. 1-4, the floor panel 1 is prepared as a laminate having a top layer 10 of flexible polymeric sheet material, a base layer 20 of stabilized polymeric material, and a backing layer 30 prepared from a non-slip polymeric material. Each of the layers 10, 20, and 30 has a different thickness, as shown. However, it is possible to have layers of equal thicknesses. The thickness, layering, and overall floor panel 1 preparation would accord to preferences of the finished product, including dimensions. The manufacturing is not held to one specific design, but rather incorporates the novel design features described in the following paragraphs.

Furthermore, certain embodiments may include co-polymers, lubricants, fillers, pigments, or combinations thereof. The amounts of the composition components are expressed as parts per hundred on the weight of the polymer ("phr").

According to the invention, the floor panel 1, which can be shaped as either a square or rectangle, has four sides a, b, c, d, wherein each side is connected by interior angles of 90° (right angles). Additionally, the floor panel 1 includes a top side 2 and a bottom side 4. In the embodiment shown, the top side 2 is prepared from the top layer 10 and the bottom side 4 is prepared using the backing layer 30.

As shown in FIGS. 1-4, the floor panel is prepared from various laminate components. In the embodiment shown, the top layer 10 is prepared having three components: a thin coating layer 12, a durable wear layer 14 and a print layer 16, with the print layer 16 having printed features. Any of the component pieces, such as the thin coating layer 12, the durable wear layer 14 or the print layer 16, may be textured in order to enhance features of the floor panel 1 construction.

The thin coating layer 12 and the durable wear layer 14 are provided on top of the print layer 16, and in the embodiment shown, the thin coating layer 12 and the durable wear layer 14 are transparent, being prepared from a plastic material having high durability.

In the embodiment shown, the print layer 16 is provided with a printed pattern, with the underside of the print layer 16 being bonded to the base layer 20 and the printed pattern facing away from the backing layer 30. The top layer 10 provides graphics and texture relief, and can be prepared to match any print or even mimic genuine metamorphic rock features.

The thin coating layer 12, although not necessary, would be a polyurethane coating having a thickness around 0.03 mm. However, it would be possible to vary the application, composition, and thickness of the thin coating layer 12 in regard to overall floor panel 1 construction.

The top layer 10 further includes a transparent wear layer 14, in the embodiment shown. The wear layer 14 would be prepared from polyvinyl chloride or other polymeric material, such as polypropylene. The wear layer 14 is utilized to protect the print layer 16. And since the wear layer 14 is transparent or clear, then any aesthetic print on the print layer 16 would be visible through the wear layer 14. Although the thickness may vary, the wear layer 14 would range from 0.1-1.5 mm. In the shown embodiment, the wear layer 14 has a thickness around 0.50 mm. However, much like the coating layer 12, the application, composition, and thickness of the wear layer 14 may be prepared according to overall floor panel 1 construction.

In an embodiment of the invention, the composition of wear layer 14 includes a polyvinyl chloride and a plasticizer. It is preferred that the polyvinyl chloride have a K-value in the ranges of 60 to 70. The plasticizer is preferred to be non-phthalate type plasticizers such as DOTP, DINCH and bio based plasticizer (i.e. Octadecanoic acid, 10-chloro-9-methoxy-.methyl ester, etc.). The wear layer 14 may also include a stabilizer that is preferred to be a non-heavy metal content type stabilizer. For instance, a calcium/stearate and/or zinc stearate or calcium/zinc combined complex soap system may be used. Furthermore, the wear layer 14 may further include a co-stabilizer. For instance, an epoxidized soybean oil may be used. A lubricant may also be added to the wear layer, such as paraffin wax. Optionally, a UV stabilizer may also be added to the wear layer 14, which includes UV absorber and hinder amine to maximize the efficiency of UV stability.

Table 1 demonstrates an exemplary composition of the wear layer 14 according to the invention.

TABLE 1

| Ingredients | Formula (phr) |
| --- | --- |
| PVC | 100 |
| Plasticizer | 18-32 |
| Heat Stabilizer | 1.0-5.0 |
| Co-stabilizer | 0.5-3.0 |
| Lubricant | 0.1-1.5 |
| UV Stabilizer | 0.1-1.5 |

The print layer 16 can be used to provide the floor panel 1 with printed graphics, which would be used to enhance the aesthetics of the floor panel 1. In the embodiment, the print layer 16 would be a decorative layer having a printed design on a top surface of the print layer 16. The thickness of the print layer 16 can range from 0.07-0.1 mm. However, in an exemplary embodiment, the print layer 16 has a preferred thickness around 0.07 mm. Although the top layer 10 is positioned on top of the base layer 20, the top layer 10 is transparent allowing any printed pattern on the top surface of the base layer 20 to be easily seen.

The print layer 16 can be printed by rotogravure printing, flexo printing, digital printing or the transfer printing.

In an embodiment of the invention, the composition of print layer 16 includes polyvinyl chloride and a plasticizer. In an embodiment of the invention, the polyvinyl chloride has a K value in range of 60 to 70. The plasticizer is preferred to be non-phthalate type plasticizers such as DOTP, DINCH and a bio based plasticizer (i.e. Octadecanoic acid, 10-chloro-9-methoxy-.methyl ester, etc.). A stabilizer may be added to the print layer 16 composition. Using a non-heavy metal content type stabilizer is preferred, such as calcium/stearate and/or zinc stearate or calcium/zinc combined complex soap system. The print layer 16 may also include a co-stabilizer. For instance, an epoxidized soybean oil may be used. A titanium dioxide may also be added to the print layer 16 in order to increase opacity.

Table 2 demonstrates an exemplary composition of the print layer 16 according to the invention.

TABLE 2

| Ingredients | Formula (phr) |
| --- | --- |
| PVC | 100 |
| Plasticizer | 0-15 |
| Heat Stabilizer | 1.0-5.0 |
| Co-stabilizer | 0.5-3.0 |
| Titanium Dioxide | 0.1-2.0 |

During manufacturing, the top layer 10, either solely the print layer 16 or a combination of the thin coating layer 12, the durable wear layer 14, and the print layer 16, may be prepared with textured features to enhance the feel of the floor panel 1. Therefore, if the top layer 10 is prepared with a printed pattern and a textured surface, the floor panel 1 will have a presentation and feel of genuine wood, ceramic, or metamorphic rock flooring.

If the print layer 16 is the top most layer of the floor panel, then the print layer 16 should be prepared from material having higher resistant and resilient properties, than if the print layer 16 is prepared with a top wear layer 10.

According to the invention, the base layer 20 is prepared from various polyvinyl chloride layers. In the shown embodiment, the base layer 20 includes an upper base section 22, an intermediate base section 24, a lower base section 26, and a glass fiber section 28. In an exemplary embodiment, the upper base section 22, the intermediate base section 24, and the lower base section 26 having differing compositions of polyvinyl chloride and a filler.

In the shown embodiment, the base layer 20 is positioned between the top layer 10 and the backing layer 30. The base layer 20 is the backbone of the construction, since it contributes greatly to the mechanical properties such as tear, gouge, indentation resistance, stiffness, flexibility etc. of the product, the cost, weight, dimensional stability, flatness and many other properties. The number of the layers in the base layer 20 construction is dependent on the overall thickness of the floor panel 1, including the thickness of the wear layer 14, the balance of the construction, the formula of each layer, as well as the product cost etc.

The upper base section 22 is the layer directly underneath the print layer 16 includes a composition of polyvinyl chloride and a filler. Other compositional elements may be provided, including plasticizers, stabilizers, pigments and a flame retardant.

The upper base section 22 has a higher amount of filler by parts per 100 parts of polyvinyl chloride than the intermediate base section 24 and the lower base section 26. As a result, the upper base section 22 will have less polyvinyl chloride and plasticizer content than the intermediate base section 24 and the lower base section 26. In the shown embodiment, the upper base section 22 provides the rigidity and the hardness of the floor panel. Because of the high filler content and less content in PVC and plasticizer, the thickness of the layer has a significant impact on the cost of the overall product.

In the shown embodiment, the upper base section 22 includes polyvinyl chloride, a primary plasticizer, a heat stabilizer, a co-heat stabilizer, a filler, a flame retardant, and a pigment. The plasticizer is preferred to be non-phthalate type plasticizers such as DOTP, DINCH and a bio based plasticizer (i.e. Octadecanoic acid, 10-chloro-9-methoxy-.methyl ester, etc.). The upper base section 22 may also include a stabilizer, such as a non-heavy metal content type stabilizer. For instance, the non-heavy metal content type stabilizer may be calcium/stearate and/or zinc stearate or calcium/zinc combined complex soap system. The upper base section 22 may also include a co-heat stabilizer, such as an epoxidized soybean oil. A filler may also be added in the upper base section 22. For instance, limestone may be used as a filler. A flame retardant, such as magnesium hydroxide, may be used. A pigment may also be added, such as carbon black or titanium dioxide.

Table 3 demonstrates an exemplary composition of the upper base section 22 according to the invention.

TABLE 3

| Ingredients | Formula (phr) |
| --- | --- |
| PVC | 100 |
| Plasticizer | 25-35 |
| Heat Stabilizer | 2.0-5.0 |
| Co-Heat Stabilizer | 4.0-6.0 |
| Filler | 300-400 |
| Flame Retardant | 10-20 |
| Pigment | 0.3-1.0 |

In the shown embodiment, the upper base section 26 includes two layers of material that is then combined with the intermediate base section 24 and lower base section 26 during manufacturing. However, one skilled in the art should appreciate that other designs are possible, including the number of single layers making up the upper base section 22.

As shown in the Figures, the intermediate base section 24 is positioned beneath the upper base section 22. According to the invention, the intermediate base section 24 has a composition similar to the upper base section 22. However, that composition transitions from high filler content to low filler content, and subsequently higher polyvinyl chloride content and plasticizer content. As a result, the intermediate base section 24 according to the invention is well balanced in the rigidity, flexibility, resiliency and many other mechanical properties.

In the shown embodiment, like the upper base section 22, the intermediate base section 24 includes polyvinyl chloride, a primary plasticizer, a heat stabilizer, a co-heat stabilizer, a filler, a flame retardant, and a pigment. However, the composition is different as shown in Table 4 below.

In the shown embodiment, the intermediate base section 24 includes polyvinyl chloride, a primary plasticizer, a heat stabilizer, a co-heat stabilizer, a filler, a flame retardant, and a pigment. The plasticizer is preferred to be non-phthalate type plasticizers such as DOTP, DINCH and a bio based plasticizer (i.e. Octadecanoic acid, 10-chloro-9-methoxy-.methyl ester, etc.). The intermediate base section 24 may also include a stabilizer, such as a non-heavy metal content type stabilizer. For instance, the non-heavy metal content type stabilizer may be calcium/stearate and/or zinc stearate or calcium/zinc combined complex soap system. The intermediate base section 24 may also include a co-heat stabilizer, such as an epoxidized soybean oil. A filler may also be added in the intermediate base section 24. For instance, limestone may be used as a filler. A flame retardant, such as magnesium hydroxide, may be used. A pigment may also be added, such as carbon black or titanium dioxide.

Table 4 demonstrates an exemplary composition of the intermediate base section 24 according to the invention.

TABLE 4

| Ingredients | Formula (phr) |
| --- | --- |
| PVC | 100 |
| Plasticizer | 28-40 |
| Heat Stabilizer | 2.0-5.0 |
| Co-Heat Stabilizer | 4.0-6.0 |
| Filler | 250-350 |
| Flame Retardant | 10-20 |
| Pigment | 0.3-1.0 |

In the shown embodiment, the intermediate base section 24 includes two separate material layers that are then combined with the upper base section 22 and lower base section 26 during manufacturing, which is described in more detail below. However, one skilled in the art should appreciate that other designs are possible, including the number of single layers making up the lower base section 26.

As shown in the Figures, the lower base section 26 is positioned beneath the intermediate base section 24. According to the invention, the lower base section 26 has a composition similar to the upper base section 22 and the intermediate base section 24. However, as previously discussed, composition of the base layer 20 transitions from high filler content to low filler content. This is performed through layering of the upper base section 22, the intermediate base section 24, and the lower base section. Subsequently, the upper base section 26 has higher polyvinyl chloride content and plasticizer content than the upper base section 22, the intermediate base section 24.

The lower base section 26 has the most polyvinyl chloride and plasticizer. The overall content polyvinyl chloride and plasticizer in the lower base section depends upon the thickness of the durable wear layer 14. A thick durable wear layer 14 is required for higher amounts of the PVC and plasticizer content in the lower base section 26 in order to get the proper balance of the construction and maintain proper flatness, dimensional stability.

In the shown embodiment, like the upper base section 22 and the intermediate base section 24, the lower base section 26 includes polyvinyl chloride, a primary plasticizer, a heat stabilizer, a co-heat stabilizer, a filler, a flame retardant, and a pigment. However, the composition is different as shown in Table 5 below.

In the shown embodiment, the lower base section 26 includes polyvinyl chloride, a primary plasticizer, a heat stabilizer, a co-heat stabilizer, a filler, a flame retardant, and a pigment. The plasticizer is preferred to be non-phthalate type plasticizers such as DOTP, DINCH and a bio based plasticizer (i.e. Octadecanoic acid, 10-chloro-9-methoxy- .methyl ester, etc.). The lower base section 26 may also include a stabilizer, such as a non-heavy metal content type stabilizer. For instance, the non-heavy metal content type stabilizer may be calcium/stearate and/or zinc stearate or calcium/zinc combined complex soap system. The lower base section 26 may also include a co-heat stabilizer, such as an epoxidized soybean oil. A filler may also be added in the lower base section 26. For instance, limestone may be used as a filler. A flame retardant, such as magnesium hydroxide, may be used. A pigment may also be added, such as carbon black or titanium dioxide.

Table 5 demonstrates an exemplary composition of the lower base section 26 according to the invention.

TABLE 5

| Ingredients | Formula (phr) |
| --- | --- |
| PVC | 100 |
| Plasticizer | 35-55 |
| Heat Stabilizer | 2.0-5.0 |
| Co-Heat Stabilizer | 4.0-6.0 |
| Filler | 200-300 |
| Flame Retardant | 10-20 |
| Pigment | 0.3-1.0 |

Figure 4:
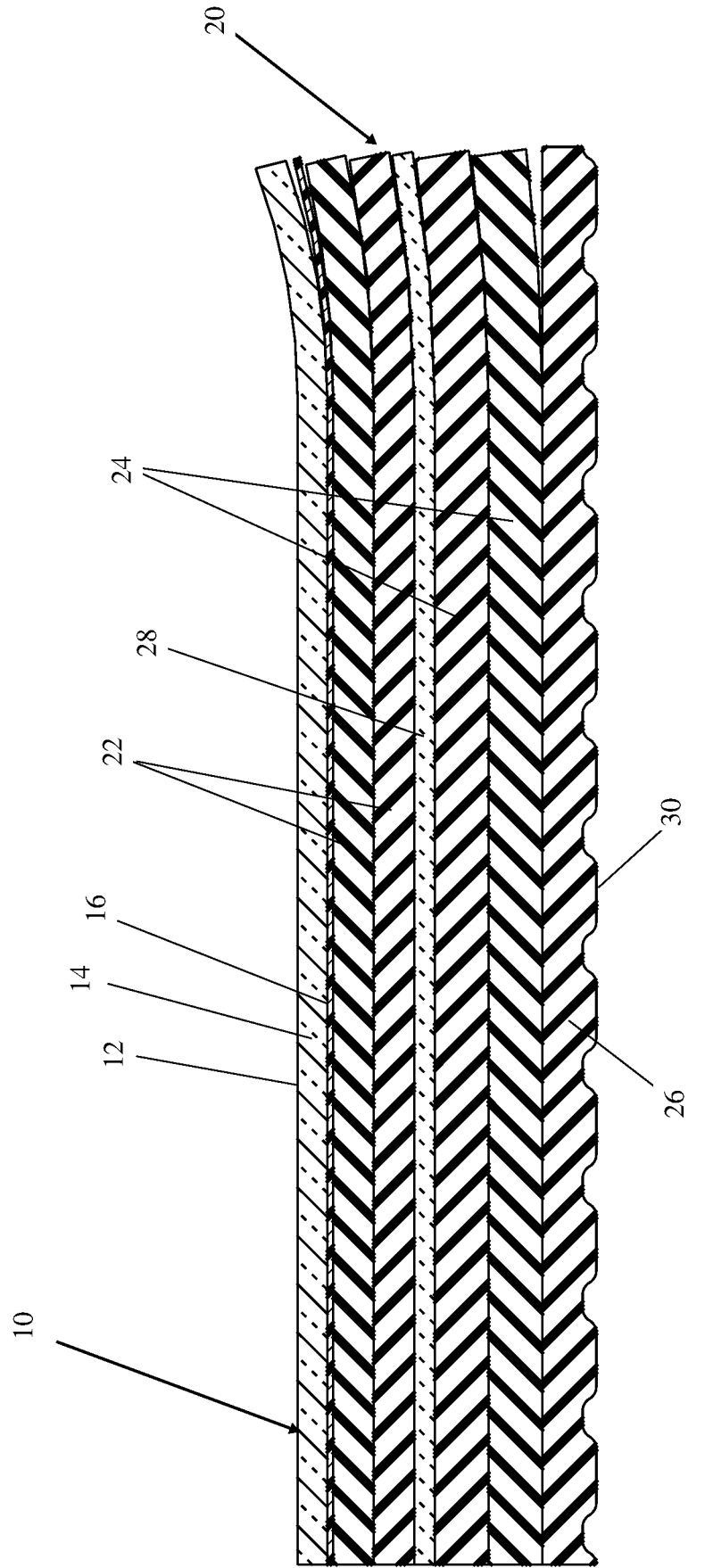
FIG. 4 is a sectional view of the floor panel of FIG. 1, taken along line 4-4.

In the shown embodiment, the lower base section 26 includes a single layer of material that is then combined with the upper base section 22 and intermediate base section 24 during manufacturing, which is described in more detail below. However, one skilled in the art should appreciate that other designs are possible, including the multiple layers making up the lower base section 26. As shown in FIG. 4, the lower base section 26 may be milled or embossed to form a pattern on the bottom of the base layer 20.

According to the invention, the base layer 20 includes a glass fiber section 28 which is added within the base section for rigidity. In the shown embodiment, the glass fiber section 28 is positioned between the upper base section 22 and the intermediate base section to control the expansion and contraction of the panel 1.

In an exemplary embodiment of the invention, the glass fiber section 28 is a veil of glass fibers in the ranges of 10 gram/m2 to 25 gram/m2 that are coated with polyvinyl plastisol. The polyvinyl plastisol is added so that the glass fiber section 28 bonds with the other sections of the base layer 20.

The overall thickness of the base layer 20 may vary. However, in the embodiment shown, the base layer 20 is prepared having a thickness ranging from 2.8 mm-4.7 mm.

Figure 3:
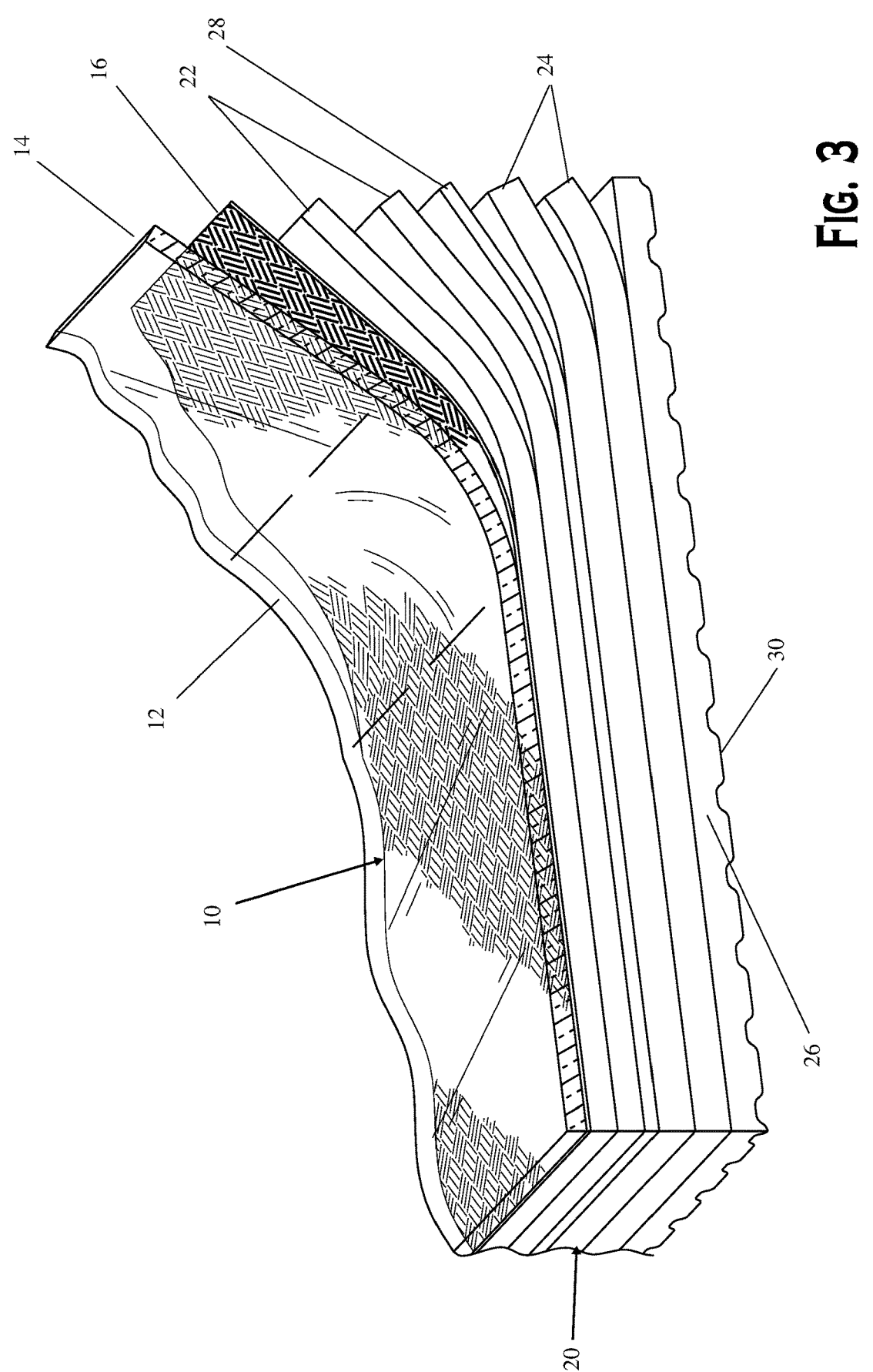
FIG. 3 is a schematic diagram of the floor panel of FIG. 1, showing layers thereof.

As shown in FIGS. 3 and 4, the backing layer 30, which is optional as well, is prepared from a single layer of non-slip plastic. The backing layer 30 functions as a non-slip backing layer. Additionally, the backing layer 30 may be provided to balance the top layer 10, essentially averting warping of the floor panel 1. Although the backing layer 30 thicknesses may vary, it is appropriate to provide the backing layer 30 having a thickness ranging from 0.2-1.0 mm, and in an embodiment of the invention the backing layer 30 has a thickness 0.2-0.3 mm. The backing layer 30 could be prepared from a variety of materials, including but not limited to polyvinyl chloride, polypropylene, polyolefin, etc. The composition would depend on the intended application of the floor panel 1.

In the shown embodiment, the backing layer 30 is attached to the lower base section 26 and makes up a bottom of the floor panel 1 in order to stabilize the floor panel 1 from the movement when the floor panel is installed. An embossed texture pattern is created to further enhance its non-slip performance of the floor panel 1. Either the backing layer 30 can be embossed or the base layer 20 can be embossed, and the backing layer 30 is then formed over the embossed base layer 20, as shown.

In an exemplary embodiment of the invention, the backing layer 30 has a composition of polyvinyl chloride and a plasticizer. Therefore, the backing layer 30 is rather pliable and adaptable to subfloor irregularity.

Figure 5:
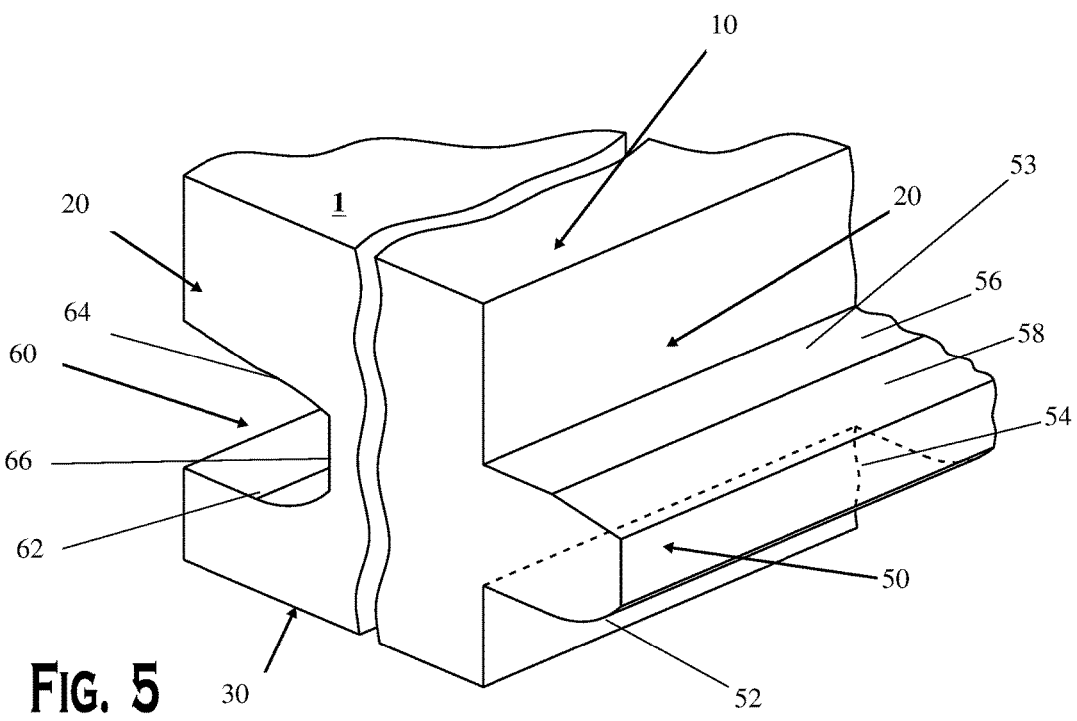
FIG. 5 is close-up view of portion 5 of the floor panel of FIG. 1.
Figure 6:
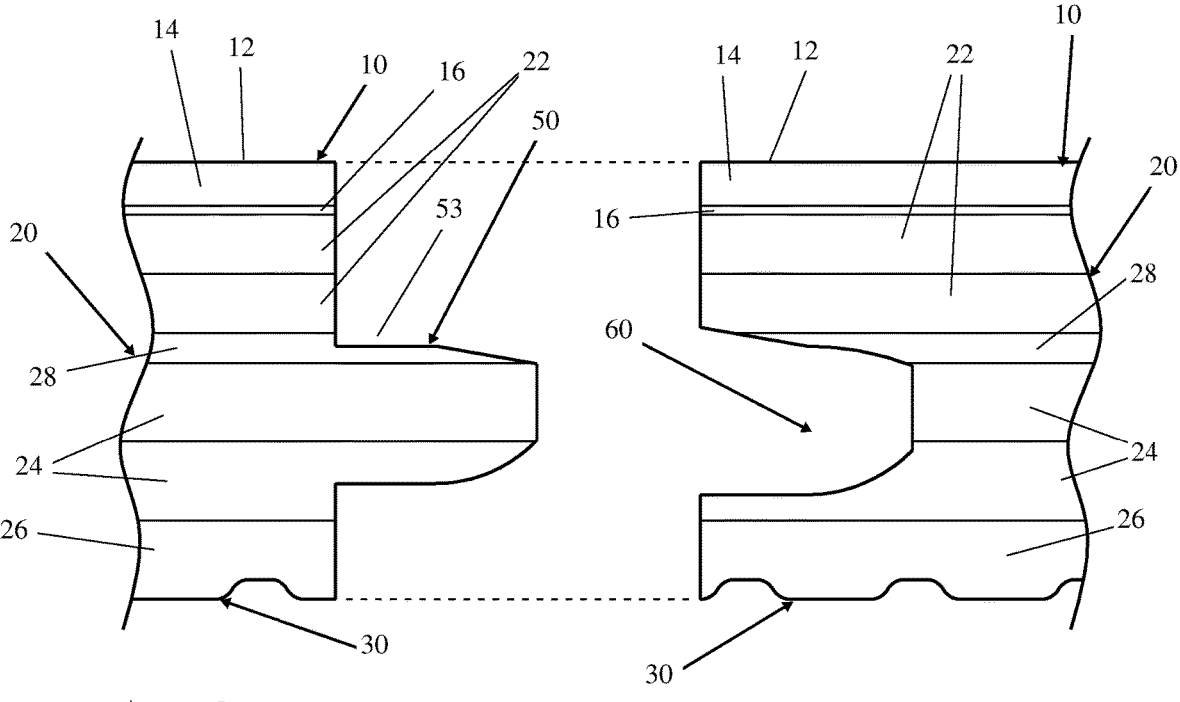
FIG. 6 is a schematic diagram of adjacent floor panels according to the invention.
Figure 7:
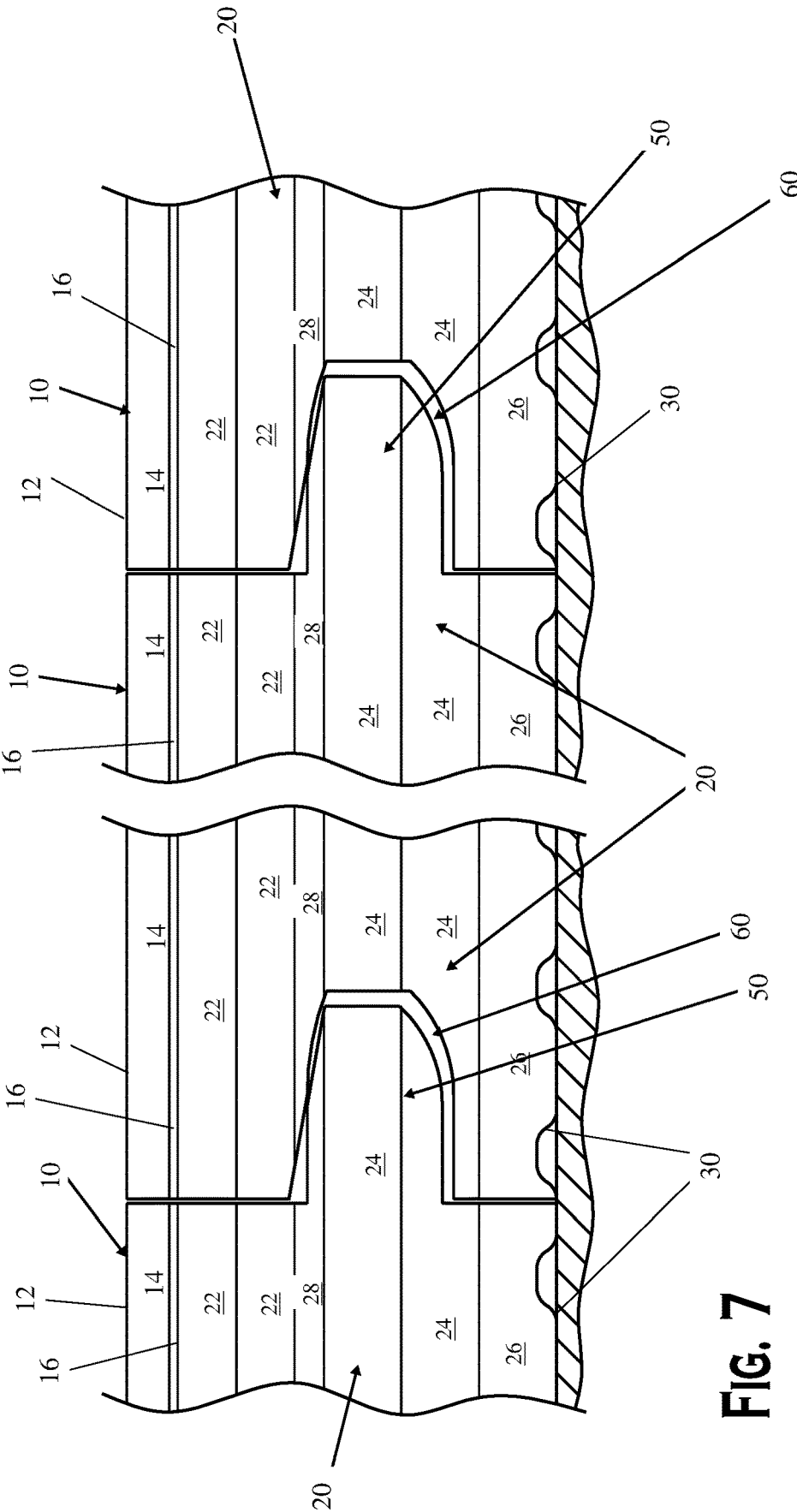
FIG. 7 is a schematic diagram of connecting adjacent floor panels according to the invention.

As shown in FIGS. 5-7, the floor panel includes tongue and groove connection sections 50, 60. The tongue and groove connection sections 50, 60 can be prepared in various shapes, i.e. although the basic shape should include a slot (the groove connection section 60) cut all along one side of the floor panel 1, and a protrusion (the tongue connection section 50) on the opposite side of the floor panel. The tongue connection section 50 should project a little less than the groove connection section 60 is prepared deep.

The tongue connection section 50 is a protrusion prepared on one side and extending longer beyond the top layer 10 of the floor panel 1. As best shown in FIG. 5, the tongue connection section 50 has a first guide element 52, which is formed on the lower section of the tongue connection section 50. The first guide element 52 is round shaped having a surface length longer than a top surface 53 of the tongue. Therefore, the first guide element 52 extends into the body of an adjacent floor panel 1, as shown in FIG. 7. The top surface 53 and the tongue end 54 should be shaped to have a flat surface 56 and tapered surface 58 to promote airflow when connecting adjacent floor panels.

The groove connection section 60 is formed on an opposite side to the tongue connection section 50. However, the groove connection section 60 extends beyond the peripheral edge of the top layer 10 of the floor panel 1. A second guide element 62, is formed by the recess and having a downwardly concave shape. The dimensions of both the first guide element 52 and the second guide element 62 should be approximately the same in both radii and length. The groove connection section 60 also includes an upper inclined wall 64 and an inner wall 66.

The tongue connection section 50 and the groove connection section 60 are formed having complimentary shapes, so that when the tongue connection section 50 engages the groove connection section 60 of another floor panel 1, the top surface 53, tongue end 54, and first guide element 52 sit against the upper inclined wall 64, inner wall 66 and second guide element 62 respectively. Since the guide elements 52, 62 have a curve shape, connecting floor panels cannot be pulled apart in the horizontal direction.

Importantly, the tongue connection section 50 and the groove connection section 60 are formed in the base layer 20. In an exemplary embodiment, the tongue connection section 50 is formed by the glass fiber section 28 and the intermediate base section 24. However, one skilled in the art should appreciate that the tongue connection section 50 can be formed in other section of the base layer 20.

Now, an exemplary procedure for manufacturing the floor panel 1 will be described.

The wear layer 14 is prepared using an extrusion process and a subsequent four roll calendaring process. The wear layer may include a polyvinyl powder, a plasticizer, a stabilizer, a co-stabilizer, a lubricant, and a UV light stabilizer as needed per formulation. These components are added together and then mixed uniformly in a low shear mixer. The mixture is then fed to a kneader extruder, which includes a screw conveyor built into the mixing chamber. The screw revolves continuously away from the discharge end and moves the material into the reach of the mixing arm, and then extruded out of the mixing chamber to form a rope-like extrudate. The extrudate is then fed into a planetary extruder. The planetary system may consist of one hollow barrel and a main spindle (screw), as well as several satellite screws (spindles), which synchronize harmoniously with each other to enable satisfactory mixing and plastification. The extrudate material is then further processed into a melt through a softer hot melt stage. The melt is then worked through a calender roll mill heated to a similar temperature. The shear mixing action on the surface of the calender rollers fluxes the melt and forms a polymer sheet having a controlled thickness. The thickness of the polymer sheet is controlled by adjusting the distance between the calendar rolls. The sheets are then cooled and collected on a reel or cut into sheets depending upon the equipment and the process of the downstream operation. For the continuous lamination operation, the sheet is produced as a roll form and then cut into a size that fits to the size of the hot press.

Next, the base layer 20 is prepared wherein each layer of the upper, middle and lower base sections 22, 24, 26 are prepared separately. For the sake of brevity, only the preparation of the upper base section 22 will be described. However, one skilled in the art would appreciate that the same process can be performed with the intermediate base section 24 and the lower base section 26 with different composition ratios, as discussed above.

First, with respect to the upper base section 22, the polyvinyl chloride, stabilizer and pigments are added together and then uniformly hot mixed using a shear mixer. The rest of the compositional elements, such as the filler and fire retardant, is feed into the mixture and then fed into kneader extruder and limestone is uniformly mixed in. The mixed composition is then fed into banbury mixer that includes two mixing rotors mounted for rotation in a mixing chamber, as well as a ram mounted for sliding the mixed compound through a passage opening into the mixing chamber. The mixed material is then discharged when target temperatures over time are achieved. At this stage, the discharged material is at a temperature of 150-215° C. in a hot melt form. The melt is then worked through a calender roll mill and heated to a similar temperature. The shear mixing action on the surface of the calender rollers fluxes the melt and forms a polymer sheet having a controlled thickness. The thickness of the upper base section 22 is controlled by adjusting the distance between the calendar rolls. The sheets are then cooled and collected on a reel or cut into sheets.

A typical procedure for the manufacture of an LVT involves laminating the base layer 20. The laminate is compressed under heat and pressure. In an embodiment of the invention, the lamination is a continuous lamination.

In an exemplary embodiment, the LVT may be prepared by laminating together the following sequence:

(1) one or more layer of the lower base section 26;

(2) the glass fiber section 28;

(3) one or more layers of the intermediate base section 24; and (4) one or more layers of the upper base section 22;

The laminated sections of the base layer 20 is then cut into slabs. For instance, the laminated base layer 20 may be cut into 1 m×1 m slabs.

At this time, the lower base section 26 may be milled or embossed to form a pattern on the bottom of the base layer 20.

A typical procedure for the manufacture of an LVT involves hot pressing the base layer 20 and the top layer 10. The laminate is compressed under heat and pressure. In an embodiment of the invention, the lamination is a continuous lamination.

In an exemplary embodiment, the LVT is then prepared by hot pressing the laminated base layer 20 with the backing layer 30 and the top layer 10 together in the following sequence:

(1) the wear layer 14;

(2) the print layer 16;

(3) the base layer 20; and (4) the backing layer 30.

An embossing plate is placed on top of the above assembled stack. The stack is then heated to approximately 130° C.-150° C. and approximately 3-5 MPa of pressure is applied through the embossing plate for about 20-30 minutes. The press is then cooled to 30°-50° C. and the LVT is removed.

Furthermore, the floor panel 1 is then cooled down for few hours and then an Ultraviolet curable coating system is applied on a surface of product to form the thin coating layer 12. The coating material is typically formulated with urethane acrylates oligomer with functional monomer and photo initiator and others that under appropriate UV energy to cure the coating and form a hard three dimensional crosslink surface. The UV coating provides an excellent surface properties for the flooring such as stain and chemical resistance, appearance & gloss retention, scratch and abrasive resistance etc.

After coating, the product is further processed through annealing in order to release the internal stress from the previous processes. Without proper annealing, the dimensional stability of the product may be compromised. Further processes may follow annealing, such as acclamation, punching, profiling to form tongue and groove locking profile, and inspection before packaging into cartons, among others well known in the industry.

The foregoing illustrates some of the possibilities for practicing the invention. Many other embodiments and fields of use for an LVT to the invention are possible and within the scope and spirit of the invention. It is, therefore, intended that the foregoing description be regarded as illustrative rather than limiting, and that the scope of the invention is given by the appended claims together with their full range of equivalents.

What is claimed is:

1. A floor panel composition comprising:
a top layer;

a base layer having an upper base layer of uniformly mixed material of uniform thickness, and a lower base layer of uniformly mixed material of uniform thickness, and an intermediate base layer of uniformly mixed material of uniform thickness;

the upper base layer includes a first distinct layer and a second distinct layer of material, the first layer abutting the second layer, each layer having a first composition of polyvinyl chloride, a limestone filler, a plasticizer, and a heat stabilizer selected from the group consisting of calcium stearate, zinc stearate, and calcium/zinc combined complex soap system, present in an amount greater than 3.0, and up to 5.0 parts per 100 parts of the polyvinyl chloride, the filler of the upper base layer being 300-400 parts per 100 parts of the polyvinyl chloride, and the plasticizer of the upper base layer being 25-35 parts per 100 parts of the polyvinyl chloride;

the lower base layer having a second composition with a higher content of polyvinyl chloride and plasticizer than the first composition of the polyvinyl chloride, the limestone filler, and the plasticizer, the filler of the lower base layer being 200-300 parts per 100 parts of the polyvinyl chloride and the plasticizer of the lower base layer being 35-55 parts per 100 parts of the polyvinyl chloride;

the intermediate base layer includes a first distinct layer and a second distinct layer of material, the first layer abutting the second layer, each layer positioned between a glass fiber section and the lower base layer, the first layer and the second layer of the intermediate base layer having a third composition comprising polyvinyl chloride, limestone filler, plasticizer, and heat stabilizer, the third composition having a content of polyvinyl chloride and plasticizer that is between that of the first composition and the second composition; and the glass fiber section positioned directly between the upper base layer and the intermediate base layer, the glass fiber section is a veil of glass fibers in the ranges of 10 gram/m$^2$ to 25 gram/m$^2$ and are coated with a composition consisting of polyvinyl plastisol; and a backing layer positioned opposite the top layer such that the base layer is positioned between the top layer and the backing layer, a bottom portion of the backing layer having a plurality of uniform grooves positioned along a length of the backing layer;

the floor panel composition further comprising a protrusion prepared on one side of the base layer and extending outward beyond the top layer, the protrusion having a top surface and a tapered surface which are both formed from the glass fiber section.

2. The floor panel composition of claim 1, wherein the upper base layer further includes an epoxidized soybean oil in an amount being 4.0-6.0 parts per 100 parts of the polyvinyl chloride.

3. The floor panel composition of claim 2, wherein the upper base layer further includes a flame retardant being 10.0-20.0 parts per 100 parts of the polyvinyl chloride.

4. The floor panel composition of claim 3, wherein the upper base layer further includes a pigment being 0.3-1.0 parts per 100 parts of the polyvinyl chloride.

5. The floor panel composition of claim 1, wherein the lower base layer further includes a heat stabilizer being 2.0-5.0 parts per 100 parts of the polyvinyl chloride.

6. The floor panel composition of claim 5, wherein the lower base layer further includes a co-heat stabilizer being 4.0-6.0 parts per 100 parts of the polyvinyl chloride.

7. The floor panel composition of claim 6, wherein the lower base layer further includes a flame retardant being 10.0-20.0 parts per 100 parts of the polyvinyl chloride.

8. The floor panel composition of claim 7, wherein the lower base layer further includes a pigment being 0.3-1.0 parts per 100 parts of the polyvinyl chloride.

9. The floor panel composition of claim 1, wherein the third composition has the filler of the intermediate base layer being 250-350 parts per 100 parts of the polyvinyl chloride.

10. The floor panel composition of claim 9, wherein the intermediate base layer further includes the plasticizer being 28-40 parts per 100 parts of the polyvinyl chloride.

11. The floor panel composition of claim 10, wherein the intermediate base layer further includes the heat stabilizer being 2.0-5.0 parts per 100 parts of the polyvinyl chloride.

12. The floor panel composition of claim 11, wherein the intermediate base layer further includes a co-heat stabilizer being 4.0-6.0 parts per 100 parts of the polyvinyl chloride.

13. The floor panel composition of claim 12, wherein the intermediate base layer further includes the flame retardant being 10.0-20.0 parts per 100 parts of the polyvinyl chloride.

14. The floor panel composition of claim 13, wherein the intermediate base layer further includes the pigment being 0.3-1.0 parts per 100 parts of the polyvinyl chloride.

15. A floor panel composition comprising:

an upper base layer of uniformly mixed material and of uniform thickness, the upper base layer includes a first distinct layer and a second distinct layer of material, the first layer abutting the second layer, each layer having:

a first polymer with a first composition;

a first limestone filler being 300-400 parts per 100 parts of the first polymer;

a heat stabilizer selected from the group consisting of calcium stearate, zinc stearate, and calcium/zinc combined complex soap system, present in an amount greater than 3.0, and up to 5.0 parts per 100 parts of the first polymer;

a first plasticizer being 25-35 parts per 100 parts of the first polymer;

a lower base layer of uniformly mixed material and of uniform thickness, the lower base layer having:

a second polymer with a second composition with a higher content of polyvinyl chloride than the first composition;

a second limestone filler being 250-350 parts per 100 parts of the second polymer; and a second plasticizer being 28-40 parts per 100 parts of the second polymer;

a glass fiber section positioned directly between the upper base layer and the lower base layer to form a base layer, the glass fiber section is a veil of glass fibers in the ranges of 10 gram/m$^2$ to 25 gram/m$^2$ and are coated with polyvinyl plastisol; and a protrusion prepared from the lower base layer and extending outward from the upper base layer, the protrusion connects a first panel to a second panel in which there is a single point of contact between the first panel and the second panel; the protrusion having a top surface and a tapered surface, which are both formed from the glass fiber section; and a backing layer positioned opposite a top layer such that the base layer is positioned between the top layer and the backing layer, a bottom portion of the backing layer having a plurality of uniform grooves intersecting a length of the backing layer.

16. The floor panel composition of claim 15, further comprising a bottom base layer positioned along the lower base layer and having polyvinyl chloride and a filler being 200-300 parts per 100 parts of the polyvinyl chloride.

17. The floor panel composition of claim 16, wherein the bottom base layer further includes a plasticizer being 35-55 parts per 100 parts of the polyvinyl chloride.

18. The floor panel composition of claim 17, wherein the bottom base layer further includes a heat stabilizer being 2.0-5.0 parts per 100 parts of the polyvinyl chloride.

19. The floor panel composition of claim 18, wherein the bottom base layer further includes a co-heat stabilizer being 4.0-6.0 parts per 100 parts of the polyvinyl chloride.

20. The floor panel composition of claim 19, wherein the bottom base layer further includes a flame retardant being 10.0-20.0 parts per 100 parts of the polyvinyl chloride.

21. The floor panel composition of claim 20, wherein the bottom base layer further includes a pigment being 0.3-1.0 parts per 100 parts of the polyvinyl chloride.

22. The floor panel composition of claim 1, wherein the first composition has a higher content of limestone filler than the second composition.

23. The floor panel composition of claim 1, wherein polyvinyl plastisol bonds with the base layer.

24. The floor panel composition of claim 15, further comprising a bottom base layer positioned along the lower base layer and having a third composition of polyvinyl chloride, plasticizer, and a filler being 200-300 parts per 100 parts of the polyvinyl chloride.

25. The floor panel composition of claim 15, wherein polyvinyl plastisol bonds with the base layer.

26. The floor panel composition of claim 1, wherein the upper base layer has been uniformly mixed through a shear mixing process.

27. The floor panel composition of claim 26, wherein the uniformly mixed material of the upper base layer is discharged from a shear mixer in a hot melt form at a temperature of about 150 to about 215° C.

28. The floor panel composition of claim 26, wherein the uniformly mixed material of the upper base layer has been processed on a calender roll mill to a sheet form having a controlled thickness.

29. The floor panel composition of claim 1, wherein the lower base layer has been uniformly mixed through a shear mixing process.

30. The floor panel composition of claim 29, wherein the uniformly mixed material of the lower base layer is discharged from a shear mixer in a hot melt form at a temperature of about 150 to about 215° C.

31. The floor panel composition of claim 29, wherein the uniformly mixed material of the lower base layer has been processed on a calender roll mill to a sheet form having a controlled thickness.

32. The floor panel composition of claim 9, wherein the bottom base layer comprises a uniformly mixed material of uniform thickness.

33. The floor panel composition of claim 32, wherein the uniformly mixed material of the bottom base layer is discharged from a shear mixer in a hot melt form at a temperature of about 150 to about 215° C.

34. The floor panel composition of claim 32, wherein the uniformly mixed material of the bottom base layer has been processed on a calender roll mill to a sheet form having a controlled thickness.

35. The floor panel composition of claim 15, wherein at least one of the upper base layer and lower base layer is uniformly mixed through a shear mixing process.

36. The floor panel composition of claim 35, wherein the uniformly mixed material of at least one of the upper base layer and lower base layer is discharged from a shear mixer in a hot melt form at a temperature of about 150 to about 215° C.

37. The floor panel composition of claim 35, wherein the uniformly mixed material of at least one of the upper base layer and lower base layer is processed on a calender roll mill to a sheet form having a controlled thickness.

38. The floor panel composition of claim 1, further comprising a groove connection section arranged on an opposite side of the base layer from the protrusion, the groove connection section including an upper inclined wall which is formed from the glass fiber section.

39. The floor panel composition of claim 15, further comprising a groove connection section arranged on an opposite side of the base layer from the protrusion, the groove connection section including an upper inclined wall which is formed from the glass fiber section.

40. The floor panel composition of claim 5, wherein at least one of the first composition, second composition, and the third composition has the heat stabilizer present in an amount of 4.0 to 5.0 parts per 100 parts of the polyvinyl chloride.

41. The floor panel composition of claim 6, wherein the co-heat stabilizer is an epoxidized soybean oil.

42. The floor panel composition of claim 12, wherein the co-heat stabilizer is an epoxidized soybean oil.

43. The floor panel composition of claim 18, wherein at least one of the upper base layer and the bottom base layer has the heat stabilizer present in an amount of 4.0 to 5.0 parts per 100 parts of the polyvinyl chloride.

44. The floor panel composition of claim 19, wherein at least one of the upper base layer, and the lower base layer further includes a co-heat stabilizer being 4.0-6.0 parts per 100 parts of the polyvinyl chloride.

45. The floor panel composition of claim 19, wherein the co-heat stabilizer of at least one of the upper base layer, lower base layer, and bottom base layer is an epoxidized soybean oil.

\* \* \* \* \*